United States Patent
Gonzalez et al.

(10) Patent No.: US 9,139,243 B1
(45) Date of Patent: Sep. 22, 2015

(54) UPRIGHT BICYCLE SECURING SYSTEM

(71) Applicants: Jose Manuel Z. Gonzalez, Atlanta, GA (US); Geovanny Z. Garcia, Atlanta, GA (US)

(72) Inventors: Jose Manuel Z. Gonzalez, Atlanta, GA (US); Geovanny Z. Garcia, Atlanta, GA (US)

( * ) Notice: Subject to any disclaimer, the term of this patent is extended or adjusted under 35 U.S.C. 154(b) by 21 days.

(21) Appl. No.: 13/864,522

(22) Filed: Apr. 17, 2013

(51) Int. Cl.
*E05B 71/00* (2006.01)
*B62H 1/06* (2006.01)

(52) U.S. Cl.
CPC ........................................ *B62H 1/06* (2013.01)

(58) Field of Classification Search
CPC ............. B62H 3/02; B62H 1/06; E05B 71/00
USPC ........... 70/233, 234, 235, 236, 18, 30, 49, 58; 280/298, 288.4, 293
See application file for complete search history.

(56) References Cited

U.S. PATENT DOCUMENTS

| | | |
|---|---|---|
| 948,349 A | 2/1910 | Settle |
| 1,143,780 A | 6/1915 | Pinto |
| 2,702,197 A | 2/1955 | Sabatino |
| 3,788,670 A | 1/1974 | Petersen |
| 4,075,877 A * | 2/1978 | Van Gompel ..................... 70/34 |
| 4,103,923 A | 8/1978 | Thomas |
| 4,887,754 A | 12/1989 | Boyer et al. |
| 5,222,707 A | 6/1993 | Myers |
| 5,513,508 A * | 5/1996 | Saunders et al. ................ 70/233 |
| D384,602 S | 10/1997 | Anderberg |
| D556,530 S | 12/2007 | Workman et al. |
| 2005/0212254 A1 | 9/2005 | Heitner |

* cited by examiner

*Primary Examiner* — Joseph Rocca
*Assistant Examiner* — Jacob Knutson
(74) *Attorney, Agent, or Firm* — Rodgers & Rodgers

(57) ABSTRACT

A system for securing a bicycle in an upright manner features a bicycle having a frame with a tube and features a stationary pole as a base for mounting. The system features a mounting device comprising a planar frame mount having a plurality of apertures. A mount second side features a rotating connection attached to a perpendicular member having a shape of an "L". The mounting device features a cylindrical piston housing attached to the perpendicular member having a centrally located piston chamber, a first cable chamber, and a second cable chamber. The mounting device features a first cable adapted to be retracted from the first cable chamber having a hook and a second cable adapted to be retracted from the second cable chamber having a loop. A piston is adapted to be retracted from the piston chamber via a piston second end having a semicircular mount.

9 Claims, 5 Drawing Sheets

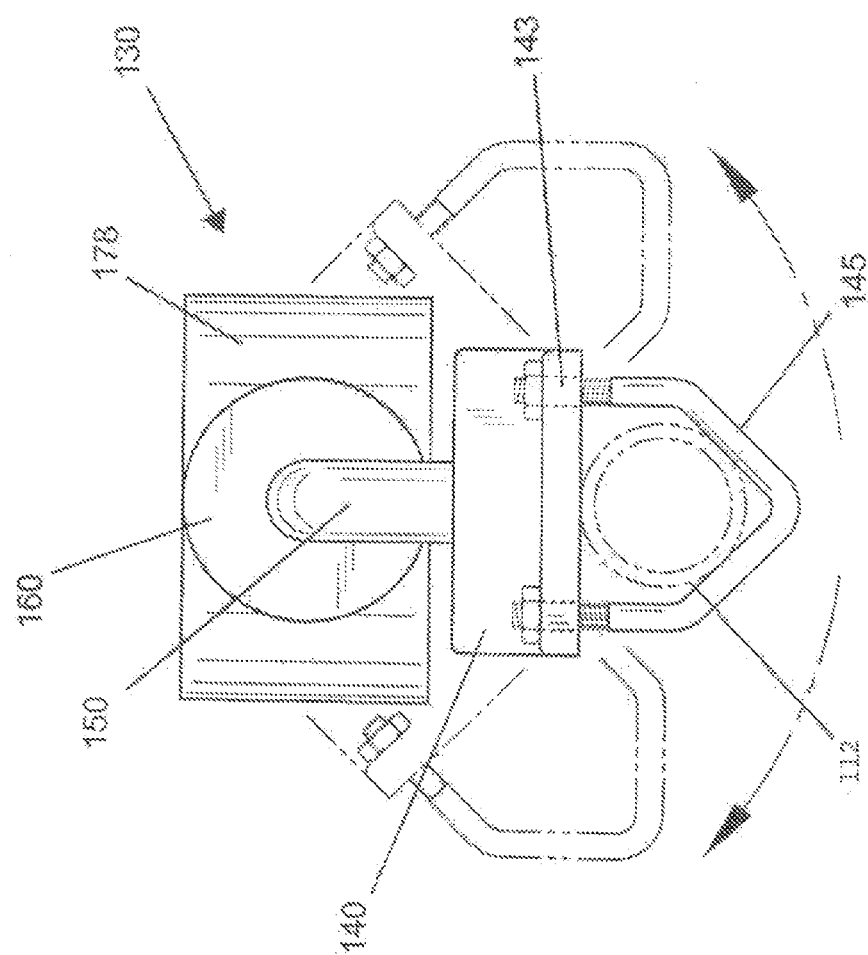

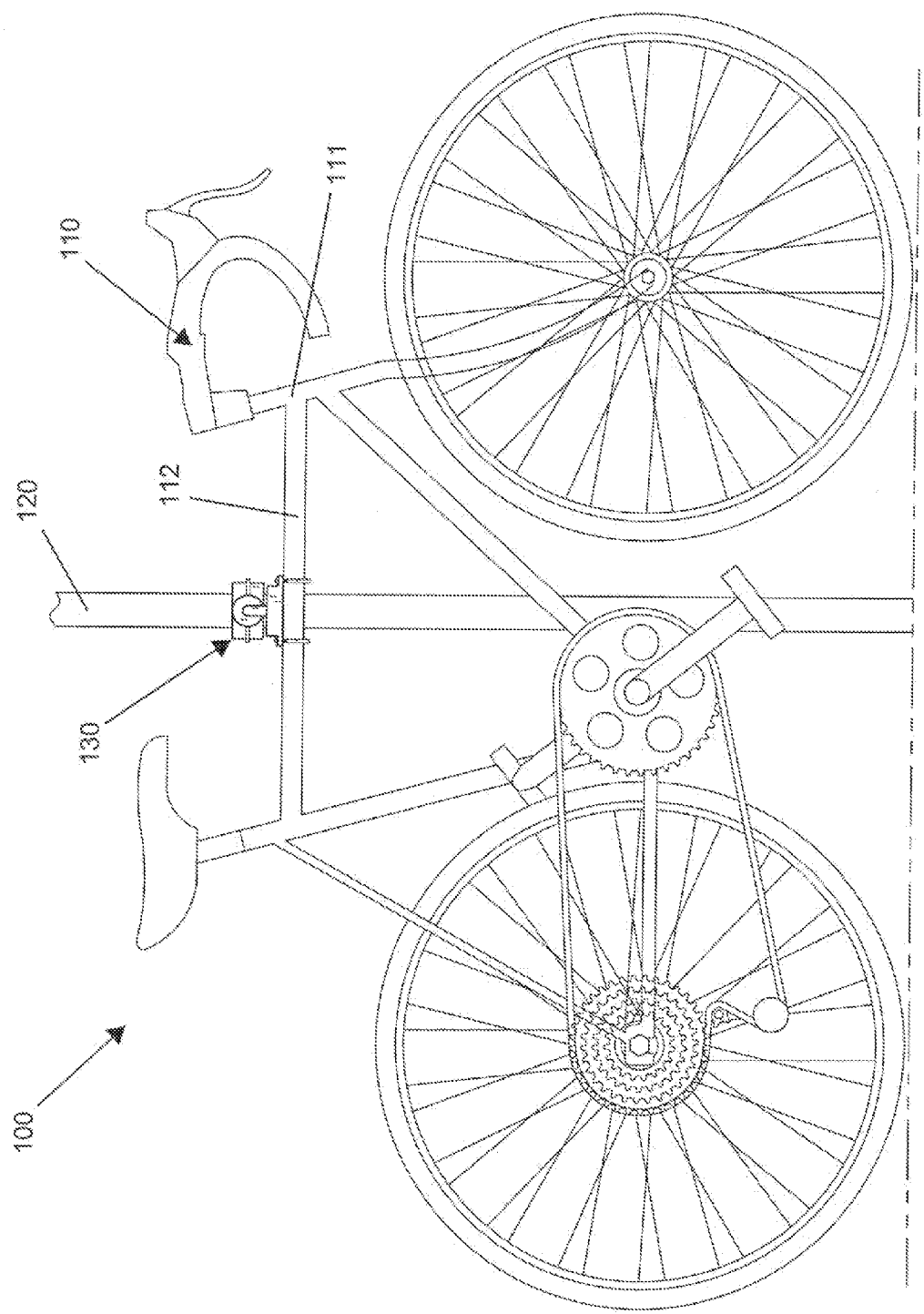

UPRIGHT BICYCLE SECURING SYSTEM

FIELD OF THE INVENTION

The present invention relates to securing systems, or more specifically, securing systems for bicycles.

BACKGROUND OF THE INVENTION

Bicycles are a versatile and lightweight means of transportation that has been around for many years. Because of their light weight and ease of mobility, they are often a prime target for theft. Sometimes, bicycles may be secured to a pole or another stationary object to prevent theft, but because of an incline, the bicycle may not be able to be positioned in a stable manner. The present invention features a system for securing a bicycle in an upright manner whether on a flat ground surface or on a slope.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for securing a bicycle in an upright manner whether on a flat ground surface or on a slope. In some embodiments, the system comprises a bicycle having a frame. In some embodiments, the frame comprises a tube. In some embodiments, the system comprises a stationary pole. In some embodiments, the stationary pole is securely affixed as a base for mounting.

In some embodiments, the system comprises a mounting device comprising a planar frame mount. In some embodiments, the frame mount comprises a plurality of apertures located therein. In some embodiments, the mount second side comprises a rotating connection. In some embodiments, the mounting device comprises a perpendicular member having a shape of an "L" attached to the rotating connection.

In some embodiments, the mounting device comprises a cylindrical piston housing attached to the perpendicular member having a centrally located piston chamber, a first cable chamber, and a second cable chamber. In some embodiments, the mounting device comprises a first cable at least partially located in the first cable chamber. In some embodiments, the first cable is adapted to be retracted from the first cable chamber via a first cable second end comprising a hook located thereon. In some embodiments, the mounting device comprises a second cable at least partially located in the second cable chamber. In some embodiments, the second cable is adapted to be retracted from the second cable chamber via a second cable second end comprising a loop located thereon. In some embodiments, the mounting device comprises a piston at least partially located in the piston chamber. In some embodiments, the piston is adapted to be retracted from the piston chamber via a piston second end comprising a semicircular mount located thereon.

In some embodiments, the bicycle is attached to the stationary pole via the mounting device. In some embodiments, the tube is securely affixed to the frame mount via a plurality of v-bolts having legs located through the apertures. In some embodiments, the semicircular mount is located against the stationary pole. In some embodiments, the first cable is retracted from the first cable housing and the second cable is retracted from the second cable housing and connected together around the stationary pole via the hook and loop.

BRIEF DESCRIPTION OF THE DRAWINGS

FIG. 4 shows a front view of the mounting device of the present invention.

FIG. 5 shows a side view of the present invention.

DESCRIPTION OF PREFERRED EMBODIMENTS

Figure 1:
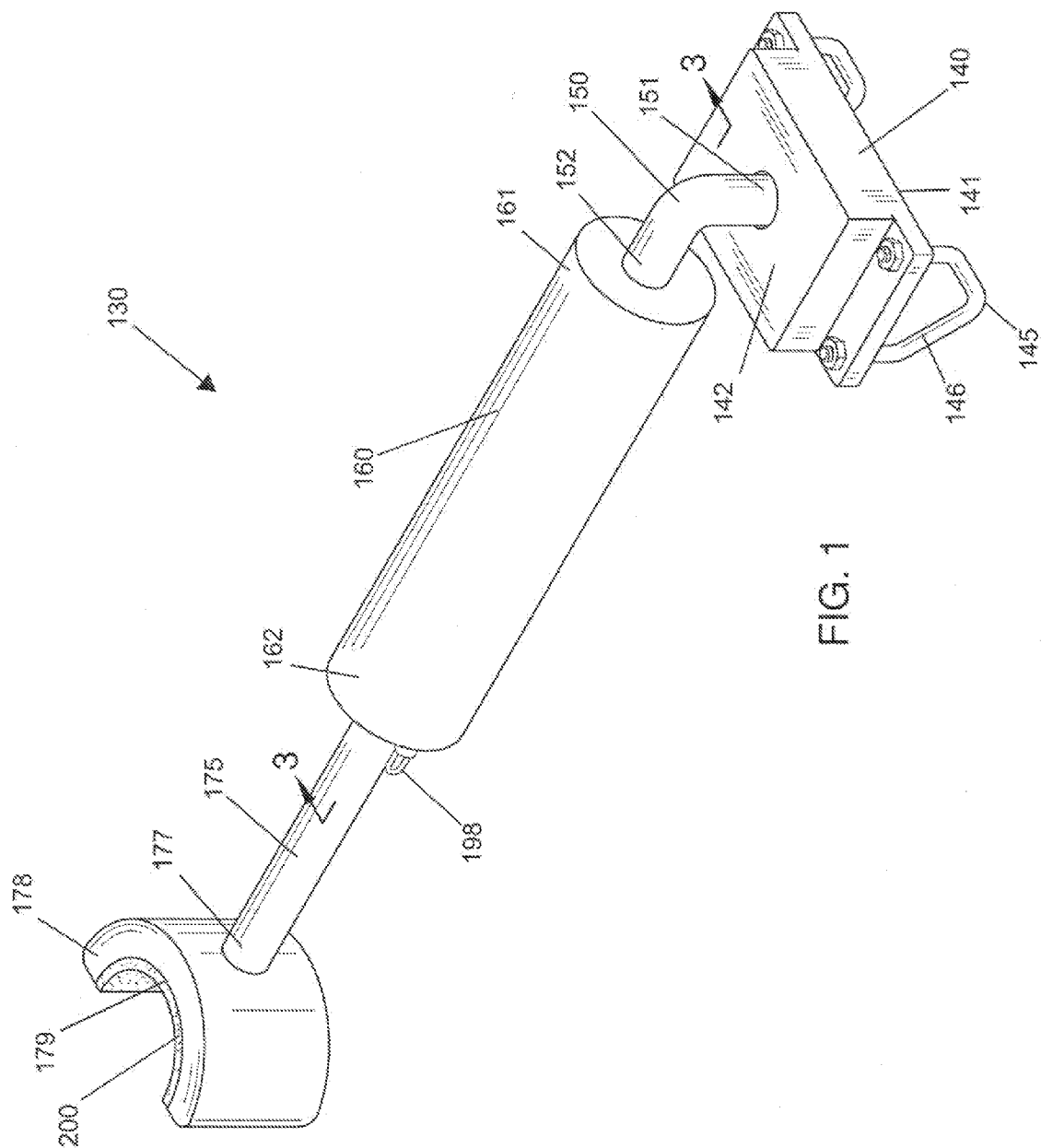
FIG. 1 shows a perspective view of the mounting device of the present invention.
Figure 2:
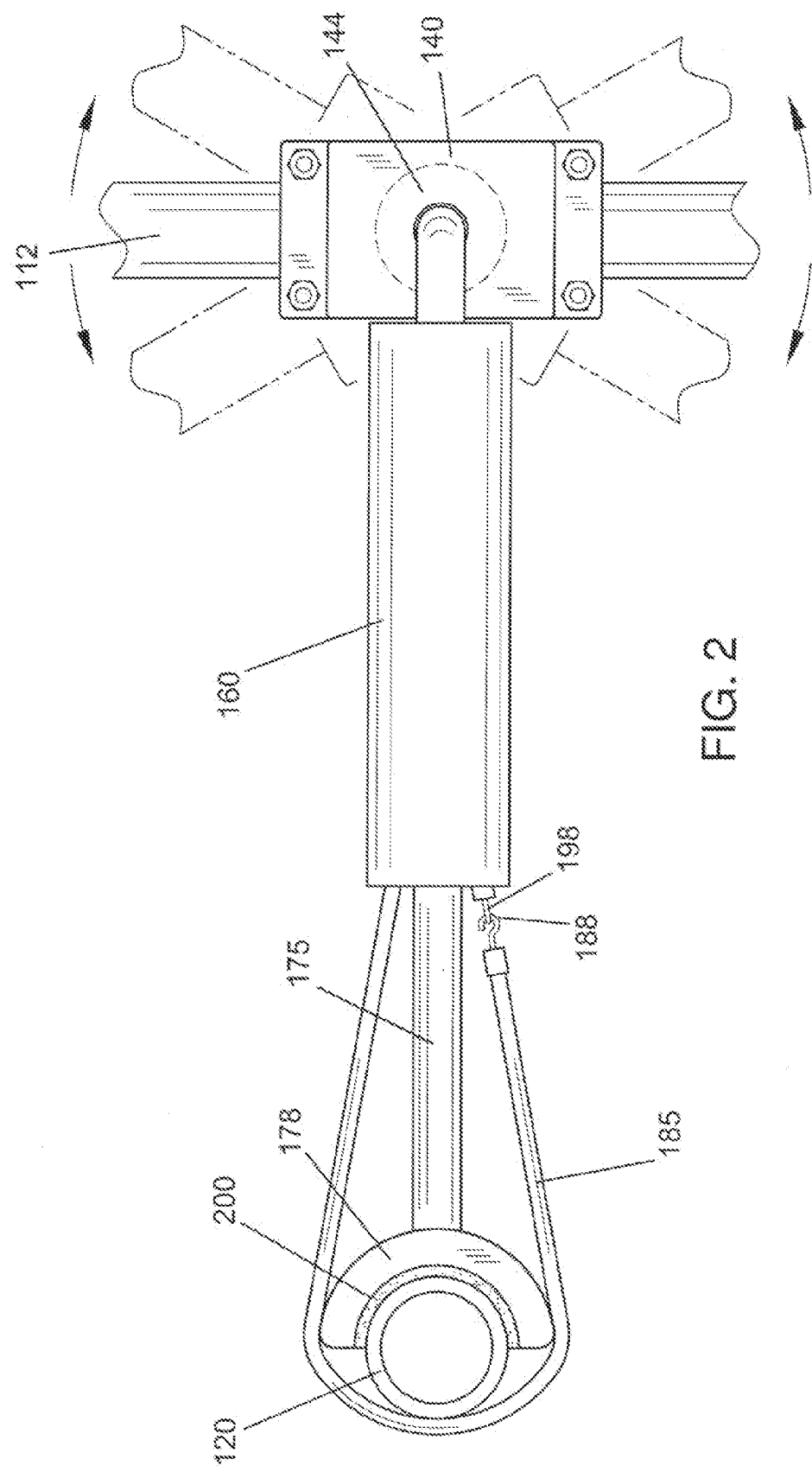
FIG. 2 shows a top view of the present invention.
Figure 3:
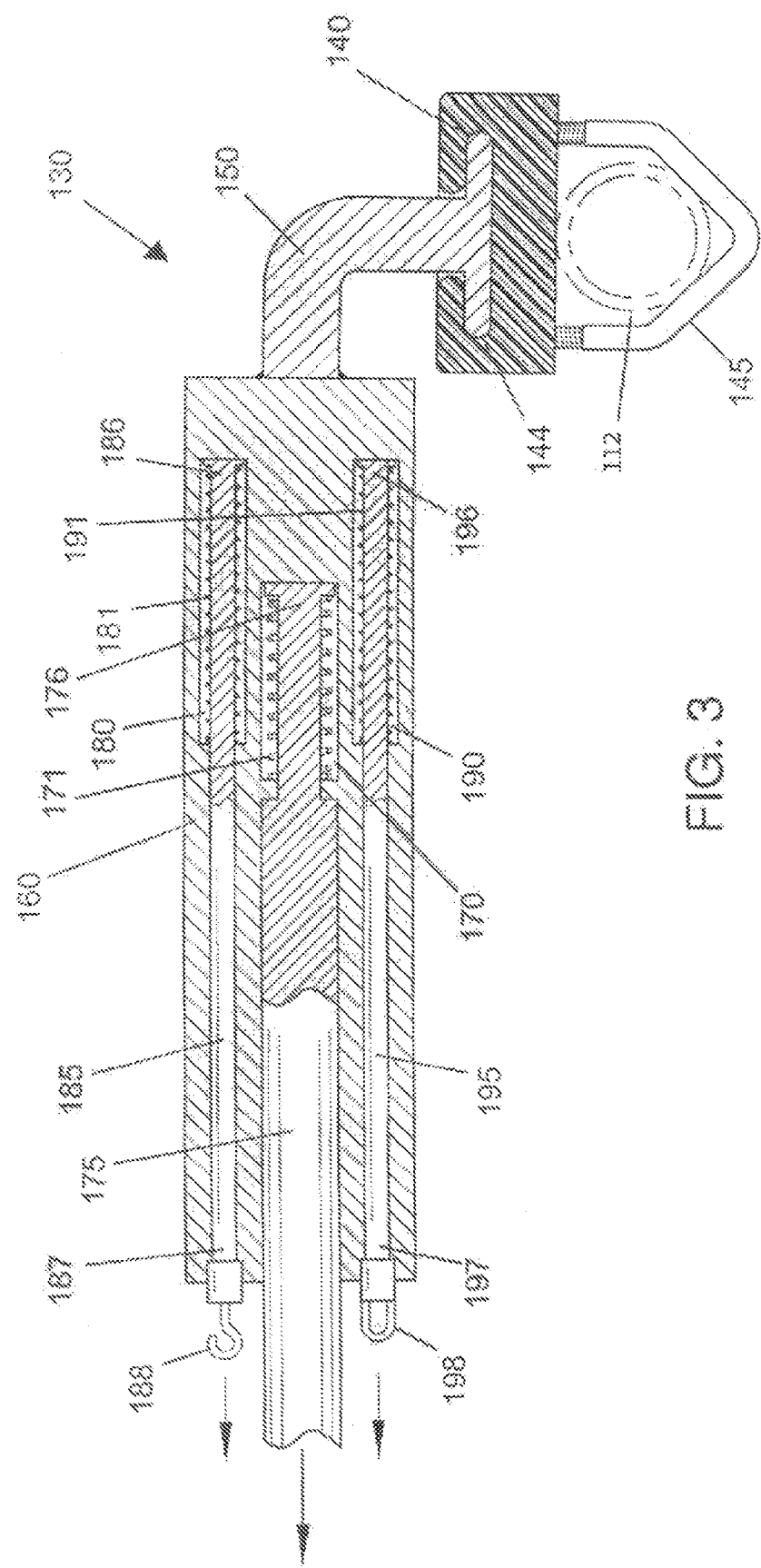
FIG. 3 shows a cross sectional view of the present invention in a sagittal plane.

Following is a list of elements corresponding to a particular element referred to herein:

100 Bicycle securing system
110 Bicycle
111 Frame
112 Tube
120 Stationary pole
130 Mounting device
140 Frame mount
141 Mount first side
142 Mount second side
143 Aperture
144 Rotating connection
145 V-bolt
146 V-bolt inside surface
150 Perpendicular member
151 Member first end
152 Member second end
160 Piston housing
161 Housing first end
162 Housing second end
170 Piston chamber
171 Piston spring
175 Piston
176 Piston first end
177 Piston second end
178 Semicircular mount
179 Semicircular mount inside surface
180 First cable chamber
181 First spring
185 First cable
186 First cable first end
187 First cable second end
188 Hook
190 Second cable chamber
191 Second spring
Second cable
196 Second cable first end
197 Second cable second end
198 Loop
200 Cushioning pad Referring now to FIG. 1-5, the present invention features a system (100) for securing a bicycle (110) in an upright manner whether on a flat ground surface or on a slope. In some embodiments, the system (100) comprises a bicycle (110) having a frame (111). In some embodiments, the frame (111) comprises a tube (112).

In some embodiments, the system (100) comprises a stationary pole (120). In some embodiments, the stationary pole (120) is securely affixed as a base for mounting. The stationary pole (120) may be horizontal, vertical or another orientation.

In some embodiments, the system (100) comprises a mounting device (130) comprising a planar frame mount (140) having a mount first side (141) and a mount second side (142). In some embodiments, the mount second side (142) has notches. In some embodiments, the frame mount (140) comprises a plurality of apertures (143) located therein from the mount first side (141) to the mount second side (142). In some embodiments, the mount first side (141) is planar and adapted to interface with the tube (112). In some embodiments, the mount second side (142) comprises a rotating connection (144). In some embodiments, the rotating connection (144) provides mounting adaptability for the frame mount (140).

In some embodiments, the mounting device (130) comprises a perpendicular member (150) having a member first end (151) and a member second end (152). In some embodiments, the perpendicular member (150) comprises a shape of an "L". In some embodiments, the member first end (151) is located on the mount second side (142) via the rotating connection (144).

In some embodiments, the mounting device (130) comprises a cylindrical piston housing (160) having a housing first end (161) and a housing second end (162). In some embodiments, the housing first end (161) is located on the member second end (152). In some embodiments, the piston housing (160) comprises a centrally located piston chamber (170), a first cable chamber (180), and a second cable chamber (190).

In some embodiments, the mounting device (130) comprises a first cable (185) at least partially located in the first cable chamber (180). In some embodiments, the first cable (185) comprises a first spring (181) located on a first cable first end (186) thereon. In some embodiments, the first cable (185) is biased to be retracted into the first cable chamber (180) via the first spring (181). In some embodiments, the first cable (185) is adapted to be retracted from the first cable chamber (180) via a first cable second end (187) comprising a hook (188) located thereon.

In some embodiments, the mounting device (130) comprises a second cable (195) at least partially located in the second cable chamber (190). In some embodiments, the second cable (195) comprises a second spring located on a second cable first end (196) thereon. In some embodiments, the second cable (195) is biased to be retracted into the second cable chamber (190) via the second spring. In some embodiments, the second cable (195) is adapted to be retracted from the second cable chamber (190) via a second cable second end (197) comprising a loop (198) located thereon.

In some embodiments, the second cable (195) extends and retracts at the same rate as the first cable (185). In some embodiments, the second cable (195) does not extend and retract at the same rate as the first cable (185). In some embodiments, the second cable (195) extends and retracts to the same length as the first cable (185). In some embodiments, the second cable (195) does not extend and retract to the same length as the first cable (185).

In some embodiments, the mounting device (130) comprises a piston (175) at least partially located in the piston chamber (170). In some embodiments, the piston (175) comprises a piston spring (171) located on a piston first end (176) thereon. In some embodiments, the piston (175) is biased to be retracted into the piston chamber (170) via the piston spring (171). In some embodiments, the piston (175) is adapted to be retracted from the piston chamber (170) via a piston second end (177) comprising a semicircular mount (178) located thereon.

In some embodiments, the bicycle (110) is attached to the stationary pole (120) via the mounting device (130). In some embodiments, the tube (112) is securely affixed to the frame mount (140) via a plurality of v-bolts (145) surrounding the tube (112) having legs located through the apertures (143). In some embodiments, the semicircular mount (178) is located against the stationary pole (120). In some embodiments, the first cable (185) is retracted from the first cable chamber (180) and the second cable (195) is retracted from the second cable chamber (190) and connected together around the stationary pole (120) via the hook (188) and loop (198) connecting together.

In some embodiments, a cushioning pad (200) is located on a semicircular mount inside surface (179). In some embodiments, a cushioning pad (200) is located on a mount first side (141). In some embodiments, a cushioning pad (200) is located on a v-bolt inside surface (146).

In some embodiments, the hook (188) comprises a locking mechanism for locking into the loop (198). In some embodiments, the locking mechanism is built in to the hook (188).

As used herein, the term "about" refers to plus or minus 10% of the referenced number.

The disclosures of the following U.S. Patents are incorporated in their entirety by reference herein: U.S. Pat. No. D 556,530; U.S. Pat. No. D 384,602; U.S. Patent Pub. No. 2005/0212254 A1; U.S. Pat. No. 5,222,707; U.S. Pat. No. 4,887,754; U.S. Pat. No. 4,103,923; U.S. Pat. No. 3,788,670; U.S. Pat. No. 2,702,197; U.S. Pat. No. 1,143,780; and U.S. Pat. No. 948,349 Settle.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed is:

1. A system (100) for securing a bicycle (110) in an upright manner whether on a flat ground surface or on a slope, the system (100) comprising:
 (a) the bicycle (110) having a frame (111), wherein the frame (111) comprises a tube (112);
 (b) a stationary pole (120), wherein the stationary pole (120) is securely affixed as a base for mounting; and
 (c) a mounting device (130) comprising:
  (i) a planar frame mount (140) having a mount first side (141) and a mount second side (142), wherein the frame mount (140) comprises a plurality of apertures (143) disposed therein from the mount first side (141) to the mount second side (142), wherein the mount first side (141) is planar and adapted to interface with the tube (112), wherein the mount second side (142) comprises a rotating connection (144), (ii) a perpendicular member (150) having a member first end (151) and a member second end (152), wherein the perpendicular member (150) comprises a shape of an "L", wherein the member first end (151) is disposed on the mount second side (142) via the rotating connection (144), (iii) a cylindrical piston housing (160) having a housing first end (161) and a housing second end (162), wherein the housing first end (161) is disposed on the member second end (152), wherein the piston housing (160) comprises a centrally disposed piston chamber (170), a first cable chamber (180), and a second cable chamber (190), (iv) a first cable (185) at least partially disposed in the first cable chamber (180), wherein the first cable (185) comprises a first spring (181) disposed on a first cable first end (186) thereon, wherein the first cable (185) is biased to be retracted into the first cable chamber (180) via the first spring (181), wherein the first cable (185) is adapted to be retracted from the first cable chamber (180) via a first cable second end (187) comprising a hook (188) disposed thereon, (v) a second cable (195) at least partially disposed in the second cable chamber (190), wherein the second cable (195) comprises a second spring (191) disposed on a second cable first end (196) thereon, wherein the second cable (195) is biased to be retracted into the second cable chamber (190) via the second spring (191), wherein the second cable (195) is retracted from the second cable chamber (190) via a second cable second end (197) comprising a loop (198) disposed thereon, and (vi) a piston (175) at least partially disposed in the piston chamber (170), wherein the piston (175) comprises a piston spring (171) disposed on a piston first end (176) thereon, wherein the piston (175) is biased to be retracted into the piston chamber (170) via the piston spring (171), wherein the piston (175) is adapted to be retracted from the piston chamber (170) via a piston second end (177) comprising a semicircular mount (178) disposed thereon;

wherein the bicycle (110) is attached to the stationary pole (120) via the mounting device (130), wherein the tube (112) is securely affixed to the frame mount (140) via a plurality of v-bolts (145) surrounding the tube (112) having legs disposed through the apertures (143), wherein the semicircular mount (178) is disposed against the stationary pole (120), and wherein the first cable (185) is retracted from the first cable chamber (180) and the second cable (195) is retracted from the second cable chamber (190) and connected together around the stationary pole (120) via attaching the hook (188) and the loop (198).

2. The system (100) of claim 1, wherein said semicircular mount comprises a semicircular mount inside surface (179), and wherein a cushioning pad (200) is disposed on a said semicircular mount inside surface (179).

3. The system (100) of claim 1, wherein a cushioning pad (200) is disposed on the mount first side (141).

4. The system (100) of claim 1, wherein said v-bolts comprise respectively v-bolt inside surfaces (146), and wherein a cushioning pad (200) is disposed on a v-bolt inside surface (146).

5. The system (100) of claim 1, wherein the hook (188) comprises a locking mechanism for locking into the loop (198).

6. A system (100) for securing a bicycle (110) in an upright manner whether on a flat ground surface or on a slope, the system (100) comprising:
the bicycle (110) having a frame (111);
said frame (111) comprising a tube (112);
a stationary pole (120) securely affixed as a base for mounting; and
a mounting device (130) comprising:
a frame mount (140) adapted to interface with said tube (112),
said mount comprising a rotating connection (144),
a cylindrical piston housing (160) having a housing first end (161) and a housing second end (162),
said housing first end (161) being secured to said frame mount,
said piston housing (160) comprising a centrally disposed piston chamber (170),
a piston (175) at least partially disposed in said piston chamber,
a piston spring (171) disposed in said piston chamber and biased to retract said piston into said piston chamber,
a first cable chamber disposed in said piston housing,
a first cable at least partially disposed in said first cable chamber,
a first spring disposed in said first cable chamber,
said first cable biased by means of said first spring to retract into said first cable chamber,
a second cable chamber disposed in said piston housing,
a second cable at least partially disposed in said second cable chamber,
a second spring disposed in said second cable chamber, and
said second cable biased by means of said second spring to retract into said second cable chamber.

7. The system according to claim 6 wherein said first and second cables comprising free ends, and wherein said first and second cables are extendable from said piston housing with the free ends adapted to interlock and extend around said stationary pole.

8. The system according to claim 6 wherein a semicircular mount is affixed to an end of said piston extending from said first housing end.

9. The system according to claim 6 wherein said piston chamber, said first cable chamber and said second cable chamber are substantially parallel.

* * * * *